Figure 1:
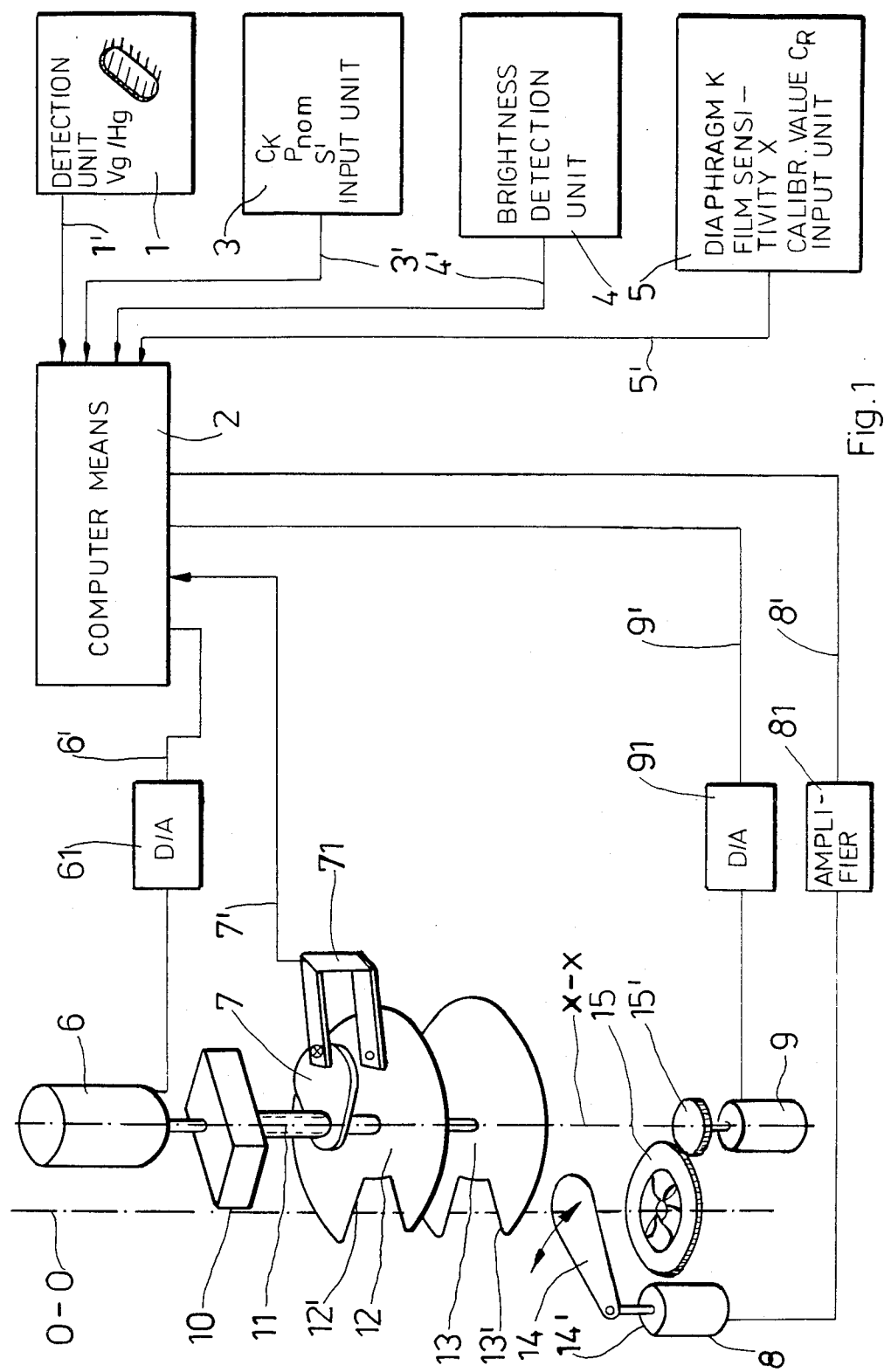

United States Patent [19]
Zeth et al.

[11] Patent Number: 4,616,911
[45] Date of Patent: Oct. 14, 1986

[54] METHOD FOR A NON-RETARDED SHUTTER RELEASE OF ROTARY SHUTTERS IN PHOTOGRAMMETRIC AERIAL CAMERAS

[75] Inventors: Ulrich Zeth; Wilfried Rempke; Klaus-Ditmar Voigt, all of Jena, German Democratic Rep.

[73] Assignee: Jenoptik Jena G.m.b.H., Jena, German Democratic Rep.

[21] Appl. No.: 738,313

[22] Filed: May 28, 1985

[30] Foreign Application Priority Data

Jun. 14, 1984 [DD] German Democratic Rep. .................. 2641354

[51] Int. Cl.<sup>4</sup> ............................................. G03B 29/00
[52] U.S. Cl. .................................................... 354/66
[58] Field of Search ....................... 354/65, 66, 71, 73

[56] References Cited

U.S. PATENT DOCUMENTS

| 2,683,402 | 7/1954 | Bruck | 354/73 |
| 2,792,767 | 5/1957 | Schmidt | 354/73 |
| 3,687,035 | 8/1972 | Morgan et al. | 354/66 |
| 4,490,028 | 12/1984 | Kucker | 354/66 |

FOREIGN PATENT DOCUMENTS 209090 4/1984 German Democratic Rep. ... 354/66

Primary Examiner—Donald A. Griffin

[57] ABSTRACT

The invention relates to a method for a non-retarded shutter release of a rotary sector shutter, particularly for use in photogrammetrical aerial cameras comprising a computer means which via a control means for rotating the rotary sectors of the shutter sets the latter to a rate of rotations in a manner that the time of photograph sequence is a multiple integer of the time interval between two feasible open times of the shutter. Probable incorrect exposures are eliminated by a variation of the diaphragm setting.

3 Claims, 2 Drawing Figures

METHOD FOR A NON-RETARDED SHUTTER RELEASE OF ROTARY SHUTTERS IN PHOTOGRAMMETRIC AERIAL CAMERAS

The invention relates to a method for a non-retarded shutter release of rotary shutters, particularly for use in photogrammetric aerial cameras for producing series of aerial photographs having a constant degree of overlap of subsequent photographs.

It is known to use rotary shutters in photogrammetric aerial cameras since such shutters permit considerably short exposure times as well as a high degree of efficiency. In rotary shutters a plurality of rotary sectors are continuously rotating, the light path of an exposure beam is unobstructed when the open portions of the sectors are in a same position in the light path. The exposure time is determined by the rate of revolutions of the rotary sectors.

In order to eliminate undesired exposures a further light stop is provided which either stops or passes the exposure light as, for example, disclosed in the DD Patent Specifications Nos. 3912 and 139315.

Due to forward motion compensation comparatively long exposure times are feasible, which, in turn, requires a slow rate of rotations of the shutter sectors, so that the time between two subsequent openings for the exposure light will increase. Hence, a variable period of time elapses between triggering the exposure release and the actual opening for the light path. Such a variable period of time is composed of a constant part which is mechanically conditioned and, hence, the same with all exposures, and a variable part depending on the actual mutual positions of the rotary sectors which results in different delays which, in the worst case, can amount up to one second. When series of photographs are taken for later map-plotting a series of exposures at constant time intervals in necessary to satisfy a constant overlap of subsequent photographs (sequence of photographs corresponds to the stereo-basis in the evaluation procedure). In order to realise such a constant degree of overlap, the relation between the speed $v_g$ and height of flight $h_g$ over ground is determined by a control unit and an overlap control, respectively, and the pulses, which correspond to a desired degree of overlap, are fed into the aerial camera for exposure triggering, as disclosed, for example, in the DD Patent Specifications Nos. 113 809, 116 517, and in the DE-Patent Specification No. 1009916.

Since, for the reasons stated hereinbefore, a different period of time passes between the triggering order and the actual exposure of the individual subsequent photographs, errors in the longitudinal overlap up to 50% of the stereoscopic basis may occur at a minimal time sequence of photographs (about 1.5 s). It is, however, necessary to stay within a given longitudinal overlap with only a tolerance of a few percent to obtain aerial photographs which permit a correct evaluation thereof. Furthermore, it is known from the DD Patent Specification No. 154 241 to vary the rate of rotations of the rotary sectors of a shutter in such a manner that the overlap of two subsequent photographs substantially coincides with the rotary shutter open period. Such a synchronization is obtained in that the rotary sectors are either braked or accelerated in a suitable manner. However, the braking or acceleration is "reset" shortly before the exposure is performed to satisfy the correct exposure value. This solution is disadvantageous since the sectors rotating with a comparatively high speed have to be accelerated or braked to definite rates of revolution in very short periods. The inertia forces involved therein require expensive technological means, apart from the fact that the moving parts are subject to an increased wear. Also means have to be provided to eliminate vibrations caused by the braking or acceleration operations.

It is an object of the present invention to obviate the above disadvantages.

It is a further object of the present invention to provide a method for increasing the accuracy and reliability in taking aerial photographs, in particular, in complying with the longitudinal overlap even under worst conditions.

These and other objects are realised in a method for non-retarded shutter release of rotary shutters in photogrammetric aerial cameras comprising an automatic exposure time and diaphragm control unit, a further control unit for computing a photograph sequence time from the relation between the speed $V_g$ and the height of flight $h_g$, and the set degree of overlap and which feeds a triggering pulse to the aerial camera at the computed photograph sequence time.

The automatic exposure time and diaphragm control computes an optimal exposure time/diaphragm combination from the brightness of a terrain and the sensitivity of a film material, in consequence sets the appropriate diaphragm of the aerial camera as well as the exposure time by a respective control of the rotary sectors of the shutter. According to the invention, the rate of revolutions of the rotary sectors of a shutter are set that the time sequence of photographs is an integer multiple of the time interval between two feasible exposure trigger times for the rotary sectors shutter and the difference between the given and the actual exposure time, realised by the rate of revolutions of the rotary sectors becomes a minimum.

Preferably, the difference between the given (nominal) and the actual exposure time, that is, the departure from the nominal one due to the rate of revolutions of the rotary sectors is balanced by a respective setting of the diaphragm.

The method according to the invention comprises the following steps:

In a first step the quotient N is computed from the time sequence of photographs $\Delta t_{BF}$ and from the shutter opening interval $\Delta t_{V\ddot{o}}$ which corresponds to the exposure time $t_B$, $$N = \frac{\Delta t_{BF}}{\Delta t_{V_o}}.$$

In a second step the value N is rounded off to the nearest integer N*.

In a third step a corrected shutter opening interval $\Delta t_{V\ddot{o}}^*$ is computed according to $$\Delta t_{V_o}^* = \frac{\Delta t_{BF}}{N^*}.$$

In a fourth step the actual exposure time $t_B^*$ is determined by $$t_B^* = t_B \cdot \frac{\Delta t^*_{v_0}}{\Delta t_{v_0}},$$

and in a last step the corrected diaphragm K* is computed and set according to $$K^* = K\sqrt{\frac{t^*_B}{t_B}},$$

where K is the diaphragm which is associated to the exposure time $t_B$ by the exposure time/diaphragm control unit and which feeds in the rate of revolutions of the rotary sectors according to the corrected shutter opening intervals.

The method according to the invention combines the rate of revolution of the rotary sections shutter and, hence, the points of time for opening the shutter, with the overlap control. Thus, the light path is opened for the exposure light at the points of time ordered by the overlap control, and the set longitudinal overlap is exactly fulfilled. Still occuring faulty exposures can be corrected by varying the diaphragm setting or in any other suitable manner.

Figure 2:
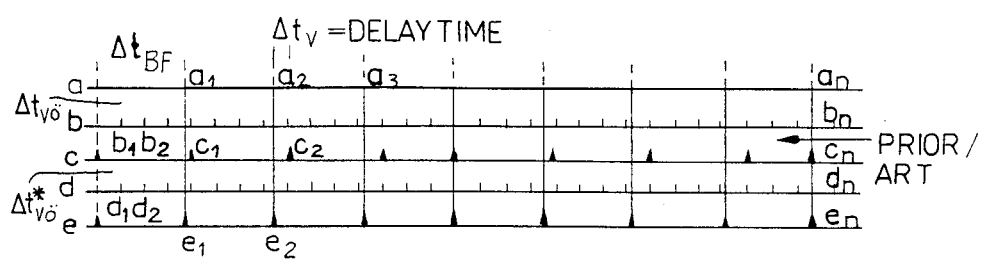

In order that the invention may be more readily understood reference is made to the accompanying drawings which illustrate diagrammatically and by way of example one embodiment thereof and where FIG. 1 is a schematic view of a rotary sector shutter for an aerial camera including a block scheme of a control unit for performing the method according to the invention, and FIG. 2 an operation diagram of a rotary sector shutter for an aerial camera according to the prior art and to the present invention, respectively.

In FIG. 1 a shutter for an aerial camera comprises about an axis x—x which is parallel to an optical light path 0—0 of the aerial camera a servo-motor 6, a gear means 10, a shaft 11, two rotary sectors 12 and 13, and a cam 7.

The rotary sectors 12 and 13 are provided with open portions 12' and 13', respectively, which, when appropriately positioned permit passage of an exposure beam along the light path 0—0 through the planes of the sectors 12 and 13. In the light path 0—0 a light stop 14 is rotatably seated about an axis of rotation 14' which is substantially in parallel to the light path 0—0 and is for rotation into or out of an exposure beam by operation of a servo-motor 8. Furthermore, a diaphragm is provided in the light path 0—0 adjustable via a gear means 15' by a servo-motor 9. A computer means 2 is connected via an D/A converter 61 to the servo-motor 6 which operates the rotary sectors 12, 13 and the cam 7 via the gear means 10 by the shaft 11 which is a composite shaft to ensure a single drive to sectors 12, 13 and to the cam 7.

The cam 7 is scanned by a detector unit 71 which via a line 7' is connected to the computer means 2. Further, the computer means 2 is connected via an amplifier 81 to the servo-motor 8 by a line 8', and to the diaphragm operating motor 9 via an D/A converter 91 by a line 9'.

Furthermore, the computer means 2 is provided with a detection unit 1, input units 3 and 5, and an exposure meter unit 4. The detection unit 1 detects the relation between the speed $V_g$ over ground of an aircraft (not shown) in which the aerial camera is installed and the height of flight over ground $h_g$ of the same, it is connected via a line 1' to the computer means 2. The input unit 3 contains a camera constant $c_k$ which supplies parameters of a taking objective used, an image side length s' and a longitudinal overlap $P_{nominal}$. These data are fed into the computer means 2 via a line 3'. A brightness detection unit 4 for detecting a brightness value E is connected to the computer means 2 via a line 4'.

A second input unit 5 serves to select a desired diaphragm value k of the diaphragm 15, the film sensitivity X of the film material used, and contains a calibration value $C_R$.

A connection line 5' connects the input unit 5 to the computer means 2.

In operation, the detection unit 1 detects the relation between $V_g$ and $h_g$ and feeds a respective signal into the computer means 2 via the line 1'. In a similar manner, the values $C_k$, indicative of the objective parameters, the image side length s' of the aerial photographs and the degree of longitudinal overlap $P_{nom}$ (in percent of s') of two subsequent photographs taken by the aerial camera are fed into the computer means 2 from the unit 3 via the line 3'. Longitudinal is here to be understood as in the direction of flight of the aircraft. According to a formula $$\Delta t_{BF} = \frac{h_g}{V_g} \cdot \frac{s'}{c_k} \cdot \left(1 - \frac{P_{nom}}{100}\right), \quad (1)$$

the computer means 2 computes the time sequence of photographs $\Delta t_{BF}$.

Furthermore, the input unit 4 feeds the diaphragm value K indicative of the nominal diaphragm 15 setting, the film sensitivity value X and the calibration value $C_R$ via the line 5' into the computer means 2, whereas the brightness value E is fed from the unit 4 via the line 4' into the computer means 2. The latter computes according to a formula $$t_B = \frac{k^2 \cdot c_R \cdot 10^{-\frac{x}{10}}}{E} \quad (2)$$

an exposure time $t_B$. The computer means 2 feeds the $t_B$ value via the line 6' into the D/A converter 61 which produces a corresponding control signal and applies the same to the servo-motor 6. The latter via the gear means 10 and the composite shaft 11 sets into rotation the shutter sectors 12, 13 and the cam 7, the rate of rotations in cooperation with the open portions 12' and 13' realises the exposure time $t_B$. The cam 7 which is connected to the sectors 12, 13 in a definite rotational relation delivers a time $\Delta t_{v\ddot{o}}$, the interval between two feasible exposures. (The light stop 14 being still in the light path 0—0). This time $\Delta t_{v\ddot{o}}$ is detected by the detector unit 71, which includes a light source and a photodetector (not designated) and via a line 7' said unit 71 delivers respective signals to the computer means 2. From these data, the computer means 2 calculates the quotient N from $$N = \frac{\Delta t_{BF}}{\Delta t_{vo}} \quad (3)$$

and in a next computation step renders N into an integer, that is, N→N*. The next computation step of the computer means 2 consist in correcting the interval between two subsequent feasible exposures according to the formula $$\Delta t^*_{vo} = \frac{\Delta t_{BF}}{N^*}. \quad (4)$$

Via the line 6' the Δt*vö signal is fed into the digital-to-analog converter 61 which feeds corresponding control signals into the servo-motor 6 which corrects the rate of revolutions of the sectors 12, 13 and the cam 7.

By the latter operation the point of time for triggering the shutter via the computer means 2 has a constant period of time difference to the feasible exposure point of time and, hence, the necessary degree of overlap of two subsequent aerial photographs ($P_{nom}$) is satisfied. Since the rate of revolutions of the sectors 12 and 13 is corrected in accordance with $\Delta t^*_{vö}$ the initially set exposure time $t_B$ does not agree with the actual exposure time $t^*_B$ computed by the computer means 2 from the formula $$t_B^* = t_B \cdot \frac{\Delta t_{vo}^*}{t_{vo}}, \tag{5}$$

the computer means 2 corrects the initially given diaphragm value k according to the formula $$K^* = K \cdot \sqrt{\frac{t^*_B}{t_B}} \text{ and a} \tag{6}$$

corrected diaphragm value K* is obtained. The corresponding K* signal is fed from the computer means 2 via the line 9' into the digital-to-analog converter 91 which appropriately controls the servo-motor 9, which, in turn, via the gear 15' sets the diaphragm 15 to the corrected K* value.

All required settings for a correct exposure being given the computer means 2 when respectively ordered via an amplifier 81 applies a trigger signal to the servo-motor 8 which rotates the light stop 14 out of the light path 0—0 so that a film material (not shown) is exposed by the exposure beam (0—0).

In FIG. 2 the diagramm 2a shows the sequence of aerial photographs $\Delta t_{BF}$ which have at the division lines $a_1, a_2 \ldots a_n$ the required degree of overlap between two subsequent photographs, for example, of $p \approx 60\%$.

In FIG. 2b, the division lines $b_1, b_2, b_3 \ldots b_n$ indicate the feasible open times of a shutter which have a timely distance of $\Delta t_{vö}$ to one another.

It is obvious from FIGS. 2a, b and represented in FIG. 2c that the photograph sequence time $\Delta t_{BF}$ which satisfies a given overlap cannot be realised by the shutter without involving a delay time $\Delta t_v$, which differs from one photograph to the next. This represents the prior art.

In FIG. 2d, the corrected photograph sequence time $\Delta t^*_{vö}$ permits to realise the shutter open times $d_1, d_2 \ldots d_n$ so that the effect according to the invention namely $N^*_x \Delta t^*_{vö} = \Delta t_{BF}$ results as can be seen from a comparison of FIGS. 2d and e. A comparison between FIGS. 2a and FIG. 2c represents an error, whereas a comparison between FIG. 2a and FIG. 2e, shows a coincidence of the shutter releases in the given intervals with the overlap interval $\Delta t_{BF}$.

We claim:

1. A method for non-retarded triggering of a rotary section shutter in aerial cameras for taking aerial photographs of a terrain from an aircraft or the like, having an exposure time control, a diaphragm control, and a shutter control, a computer means, the former being connected to the computer means, a removable light stop for blocking an exposure beam to prevent undesired exposure, comprising the steps of computing a sequence time of photographs $t_{BF}$ from the relation between the speed of flight $V_g$ and the height of flight $h_g$ of said aircraft and from a set degree of overlap $P_{nom}$ of each two subsequent photographs, computing from the brightness of the terrain and from the film material sensitivity a diaphragm and exposure time setting value, feeding said diaphragm and exposure time setting value into the diaphragm control and the shutter control, respectively, thus defining feasible exposure points of time via the rate of revolution of said rotary sectors of the shutter, feeding the feasible exposure points of time into the computer means, computing $\Delta t_{vö}$ being the interval between two feasible exposure points of time, varying $\Delta t_{vö}$ to $\Delta t^*_{vö}$ to satisfy the condition $T_{BF} = n \cdot \Delta t^*_{vö}$, wherein n is any suitable integer, computing correction signals from $\Delta t^*_{vö}$, applying said correction signals to the shutter control for varying the rate of revolutions of the rotary sectors of the shutter, thus minimizing the difference between a preset exposure time and the exposure time realised by the rate of revolutions of the rotary sector shutter, and removing the light stop out of the exposure beam for exposure of a film material.

2. A method for non-retarded triggering of a rotary section shutter as claimed in claim 1, wherein an exposure variation due to the difference between the given exposure time and the exposure time realised by the rate of revolutions of the rotary sections is compensated by a respective variation of the diaphragm setting.

3. A method as claimed in claim 2, wherein a quotient $$N = \frac{\Delta t_{BF}}{\Delta t_{vo}}$$

is computed, where $\Delta t_{BF}$ is the time sequence of two subsequent photographs having a definite degree of mutual overlap, and $\Delta t_{vö}$ the interval between two subsequent shutter open times substantially corresponding to the exposure time $t_B$, rounding off the value N to the nearest integer N*, computing a corrected open time for the shutter according to $$\Delta t^*_{vo} = \frac{\Delta t_{BF}}{N^*},$$

defining the realised exposure time $t^*_B$ according to $$t_B^* = t_B \cdot \frac{\Delta t^*_{vo}}{t_{vo}},$$

computing the corrected diaphragm value K* according to $$K^* = K \cdot \sqrt{\frac{\Delta t^*_B}{\Delta t_B}},$$

setting the corrected diaphragm K*, where K is the diaphragm associated to $t_B$, controlling the rate of revolutions of the rotary sectors according to the corrected shutter open intervals $t^*_{vö}$.

* * * * *